(12) United States Patent
Evans

(10) Patent No.: US 11,539,757 B1
(45) Date of Patent: Dec. 27, 2022

(54) INTEROPERABILITY BETWEEN RCS NETWORKS AND PROPRIETARY MESSAGING PLATFORMS

(71) Applicant: Fuze, Inc., Boston, MA (US)

(72) Inventor: Aaron Evans, Ottawa (CA)

(73) Assignee: Fuze, Inc., Campbell, CA (US)

( * ) Notice: Subject to any disclaimer, the term of this patent is extended or adjusted under 35 U.S.C. 154(b) by 2 days.

(21) Appl. No.: 17/131,435

(22) Filed: Dec. 22, 2020

(51) Int. Cl.
 *H04L 65/1016* (2022.01)
 *H04L 51/066* (2022.01)
 *H04L 65/1069* (2022.01)
 *H04L 65/1073* (2022.01)
 *H04L 51/58* (2022.01)

(52) U.S. Cl.
 CPC ........ *H04L 65/1016* (2013.01); *H04L 51/066* (2013.01); *H04L 51/58* (2022.05); *H04L 65/1069* (2013.01); *H04L 65/1073* (2013.01)

(58) Field of Classification Search
 CPC ... H04L 65/1016; H04L 51/066; H04L 51/38; H04L 65/1069; H04L 65/1073; H04L 63/08; H04L 29/06027; H04L 67/125; H04L 41/0803; H04L 69/08; H04L 51/063; H04L 43/08; H04L 41/0681; H04W 88/16; H04W 4/14
 USPC .......................................................... 370/329
 See application file for complete search history.

(56) References Cited

U.S. PATENT DOCUMENTS

| | | | |
|---|---|---|---|
| 9,532,197 B1* | 12/2016 | Lew | H04W 8/28 |
| 2010/0317376 A1* | 12/2010 | Anisimov | H04M 3/5141 |
| | | | 455/466 |
| 2019/0182749 A1* | 6/2019 | Breaux | H04W 76/14 |

* cited by examiner

*Primary Examiner* — Melvin H Pollack
(74) *Attorney, Agent, or Firm* — Crawford Maunu PLLC

(57) ABSTRACT

Methods, systems, and storage media for providing interoperability for advanced messaging features between RCS and proprietary messaging platforms are disclosed. Exemplary implementations may: register a user of a messaging platform with an external network; associate the user with an identifier of the external network; configure an adapter to receive notifications from the identifier of the external network via a subscription; and receive, via the adapter at the messaging platform, the notifications addressed to the identifier of the external network based on the subscription.

17 Claims, 6 Drawing Sheets

INTEROPERABILITY BETWEEN RCS NETWORKS AND PROPRIETARY MESSAGING PLATFORMS

BACKGROUND

Field

The present disclosure generally relates to communication across multiple text messaging platforms. More specifically, the present disclosure relates to interoperability of advanced chat features between proprietary platforms and short messaging service (SMS)/rich communication service (RCS) platforms.

Description of Related Art

Many personal computer (PC) and web-based platforms exist supporting chat (e.g., text-based communication between two or more participants). Conventional platforms provide chat between two remote users, an ability to create a group of multiple member users where each individual member user receives all messages sent from all other individual users in the group, presence indicators (e.g., available, offline, away, busy, etc.), typing notifications to show a receiving users when a sending user is currently typing a message to send, and delivered and read receipts. Short messaging service (SMS) based exchanges were the first to allow chat messaging between mobile users using their subscriber phone number for addressing. However, SMS has lacked the ability to support advanced features like group messaging, presence, typing notifications, and delivered/read receipts. Since the widespread adoption of SMS, many proprietary consumer and enterprise platforms have emerged to support these features across PC, web-based, and mobile clients. Although RCS allows for these advanced features between mobile SMS subscribers, and proprietary messaging platforms support these features between users of those platforms, there is currently no ability to support these features for conversations that span these domains.

SUMMARY

One aspect of the present disclosure relates to a method for providing interoperability for advanced messaging features between RCS and proprietary messaging platforms. The method may include registering a user of a messaging platform with an external network. The method may include associating the user with an identifier of the external network. The method may include configuring an adapter to receive notifications from the identifier of the external network via a subscription. The method may include receiving, via the adapter at the messaging platform, the notifications addressed to the identifier of the external network based on the subscription.

Another aspect of the present disclosure relates to a system configured for providing interoperability for advanced messaging features between RCS and proprietary messaging platforms. The system may include one or more hardware processors configured by machine-readable instructions. The processor(s) may be configured to register a user of a messaging platform with an external network. The processor(s) may be configured to associate the user with an identifier of the external network. The processor(s) may be configured to configure an adapter to receive notifications from the identifier of the external network via a subscription. The processor(s) may be configured to receive, via the adapter at the messaging platform, the notifications addressed to the identifier of the external network based on the subscription.

Yet another aspect of the present disclosure relates to a non-transient computer-readable storage medium having instructions embodied thereon, the instructions being executable by one or more processors to perform a method for providing interoperability for advanced messaging features between RCS and proprietary messaging platforms. The method may include registering a user of a messaging platform with an external network. The method may include associating the user with an identifier of the external network. The method may include configuring an adapter to receive notifications from the identifier of the external network via a subscription. The method may include receiving, via the adapter at the messaging platform, the notifications addressed to the identifier of the external network based on the subscription.

Still another aspect of the present disclosure relates to a system configured for providing interoperability for advanced messaging features between RCS and proprietary messaging platforms. The system may include means for registering a user of a messaging platform with an external network. The system may include means for associating the user with an identifier of the external network. The system may include means for configuring an adapter to receive notifications from the identifier of the external network via a subscription. The system may include means for receiving, via the adapter at the messaging platform, the notifications addressed to the identifier of the external network based on the subscription.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
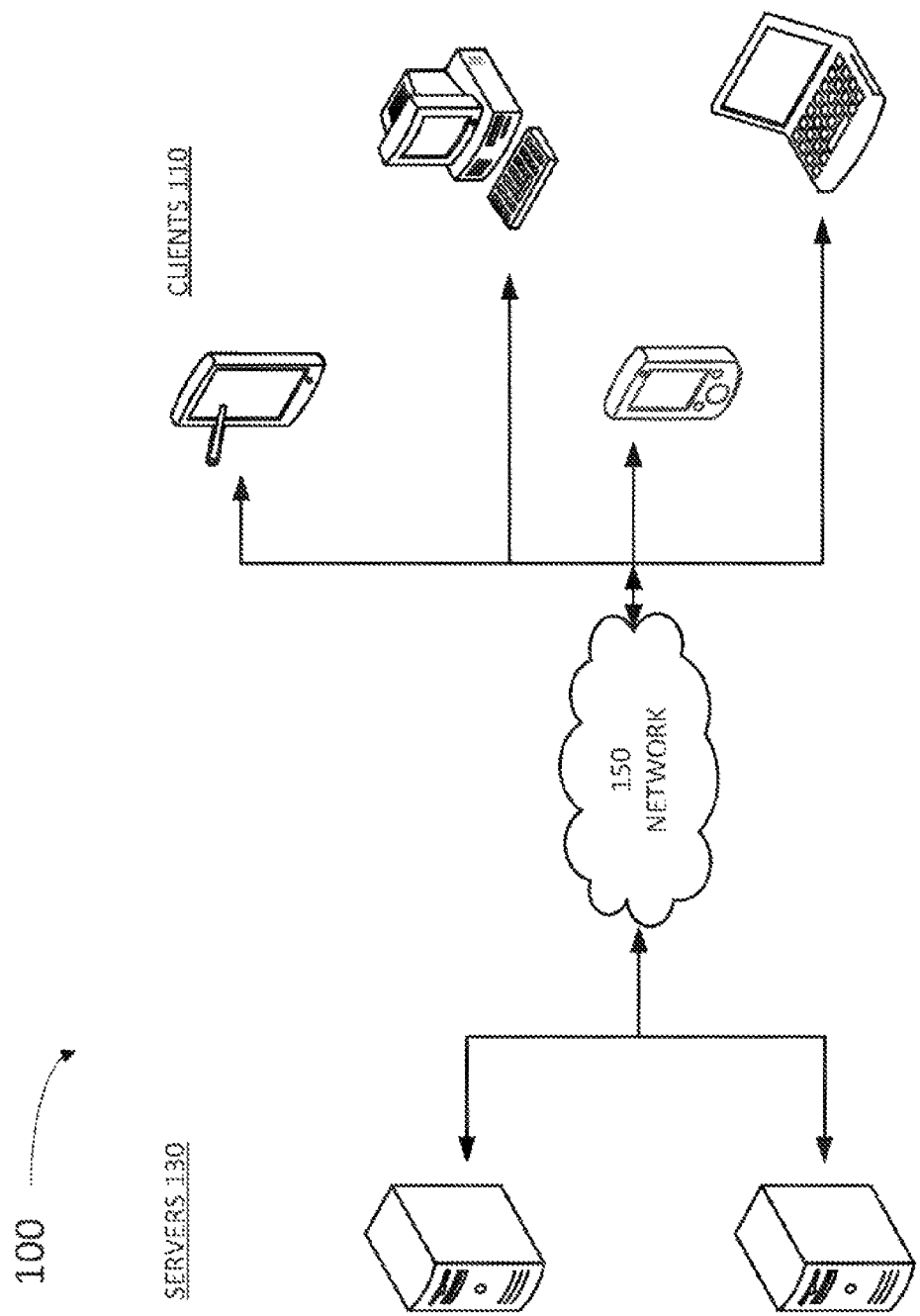
FIG. 1 illustrates an example architecture suitable to provide a platform for providing interoperability for advanced messaging features between RCS and proprietary messaging platforms, according to some embodiments.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

General Overview

Existing proprietary consumer and enterprise platforms are "closed" systems in the sense that they generally do not provide interoperability with one another and, to the extent that they interoperate with SMS, an SMS-based participant does not get the benefit of the advanced features. For example, SMS users have no way of knowing if the other party has received and read their messages, and they do not receive typing notifications when the other party is typing a response. These shortcomings leave users with less information to understand how engaged the other party is in the conversation.

Implementations described herein address these and other problems by extending a proprietary messaging platform to interface with SMS based carriers that have rolled out rich communication services (RCS) in such a way as to support advanced features across a heterogeneous group of individuals where some are using the messaging platform software while others are external mobile subscribers. Implementations described herein provide an adapter mechanism between a carrier supporting the RCS protocol and a proprietary messaging platform. Exemplary implementations convert typing notifications and delivery and read receipts to the RCS protocol standard and vice-versa, convert proprietary user/endpoint addressing schemes to valid representations for the RCS protocol and vice-versa, and convert group meta-data and membership information between a proprietary messaging platform and the RCS protocol and vice-versa.

To illustrate, Apple's iMessage® has been one of the most dominant consumer platforms for mobile users and it provides interoperability across mobile subscribers by using the iMessage platform to send/receive messages with other Apple users and falling back to SMS for all others. However, it is a closed, proprietary system that is not standards based. The experience for non-Apple users is very degraded, e.g., they cannot participate in group chats, receive/send typing notifications, and delivered/read receipts are not supported. In response to this, Google® led the development of the RCS standard which is designed to be an open standard to provide these more advanced chat features across mobile subscribers by layering on top of SMS. It is designed to gracefully degrade to regular SMS for carriers and client devices that do not support the standard.

Many unified communications as a service (UCaaS) and contact center as a service (CCaaS) proprietary platforms that provide chat and presence functions provide the ability to communicate with external contacts by interfacing with one or more telecommunications carriers via an SMS gateway or application programming interface (API). Similar to the iMessage example, end-users of the UCaaS and CCaaS platforms enjoy advanced chat features when interacting with other end-users of the UCaaS and CCaaS platform. However, when it comes to interacting with external SMS contacts, group chat, presence, typing notifications and receipts (delivered and read) features cannot be supported. While RCS allows for these advanced features between mobile SMS subscribers and meanwhile, proprietary messaging platforms (including UCaaS and CCaaS) support these features between users of those platforms, there is currently no ability to support these features for conversations that span these domains.

In the area of CCaaS, these platforms typically support the ability for customers to initiate contact with customer service representatives via a variety of channels: voice (e.g., inbound public switched telephone network (PSTN) calls to a phone number), chat initiated from a web site and SMS via inbound text messages to a specific company phone number or short code. Based on this mechanism, users within a proprietary messaging or UCaaS platform can interface with external SMS contacts with the above-mentioned advanced features, just as they would with other users of the proprietary system. In addition, this mechanism has important implications for chat-based interactions in the area of contact center. Within a CCaaS platform, agents will be able to tell when the external contact has received and read messages sent by the agent and vice versa. Bidirectional typing notifications also help to maintain engagement between these parties.

In some implementations, an "engagement" score may be determined to prioritize conversations for a contact center agent when handling multiple chats at once. Inputs to this computation may include the length of time from when an agent sends a reply to when the external contact has read it as well as the amount of time from when the response is read and when the external participant begins to type a reply. These may be considered over successive message exchanges between the parties, e.g., the time period between events may shorten indicating a high level of engagement or they may begin to get further apart showing the contact is getting less engaged and/or distracted by other activities. Based on this, the CCaaS application may predict the duration of the delays and direct the agent's attention to conversations where a response from the external contact is anticipated or where a quick reply may be desired in order to maintain engagement.

Example System Architecture

FIG. 1 illustrates an example architecture 100 suitable to provide a platform for providing interoperability for advanced messaging features between RCS and proprietary messaging platforms, according to some embodiments. Architecture 100 includes servers 130 and clients 110 connected over a network 150. One of the many servers 130 is configured to host a memory including instructions which, when executed by a processor, cause server 130 to perform at least some of the steps in methods as disclosed herein. In some embodiments, the processor in server 130 is configured to host a rich communication messaging event that a participant may access through client device 110. Further, in some embodiments, the processor in server 130 is configured to provide documents including images, video and text messaging services to a participant in a rich communication messaging event through client device 110. In some embodiments, the documents provided by server 130 to one or more participants may include an application-based document (e.g., a text-rich document such as a Word document, a PDF document, or any other document accessible through a text editing application, including a computer code sequence, and the like), a spreadsheet document (e.g., Excel and the like), a presentation document (e.g., Power Point and the like), an XML file, a HTML file, a multi-media file such as a video, audio, image file, or any combination of the above. Information related to, and instructions to handle the rich communication messaging event may be stored in a rich communication messaging event engine 242 accessible by a participant through a client device 110 (e.g., accessible through a web page or an application 222 running on client device 110). Servers 130 can return images, documents, rich-text documents and the like intended for a shared use and modification by multiple participants in a rich communication messaging event. For purposes of load balancing, multiple servers 130 can host memories including instructions to one or more processors and multiple servers 130 for hosting one or more rich communication messaging events as disclosed herein.

Servers 130 may include any device having an appropriate processor, memory, and communications capability for hosting the documents and applications associated with rich communication messaging event engine 242. Rich communication messaging event engine 242, may be accessible by multiple participants through various client devices 110 over the network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing rich communication messaging event engine 242 on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
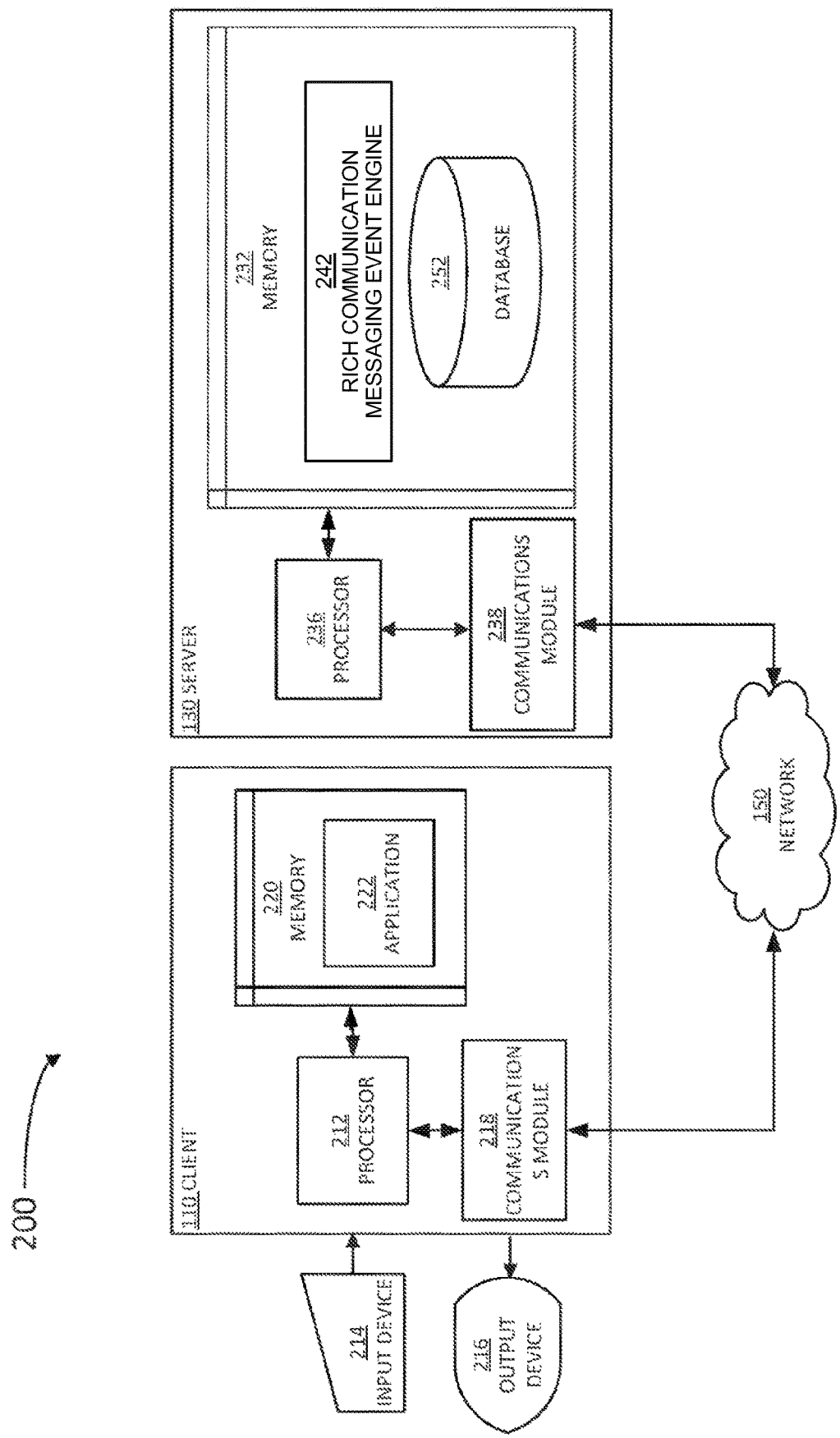
FIG. 2 is a block diagram illustrating an example server and client from the architecture of FIG. 1 according to certain aspects of the disclosure.

FIG. 2 is a block diagram 200 illustrating an example server 130 and client device 110 in the architecture 100 of FIG. 1 according to certain aspects of the disclosure. Client device 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Client device 110 may be any one of a desktop computer, a laptop, or a mobile computing device. Client device 110 may include a processor 212 and a memory 220. An input device 214 and an output device 216 enable the user to interact with client device 110. Examples of input device 214 and output device 216 may include a mouse, a keyboard, a display, a touch-interactive display, and the like.

Server 130 includes a memory 232, a processor 236, and communications module 238. The user interface is displayed for the user in an output device 216 of client device 110. Memory 232 includes a rich communication messaging event engine 242 and a database 252. Rich communication messaging event engine 242 includes instructions which, when executed by processor 236, cause server 130 to perform at least partially steps as disclosed herein. For example, rich communication messaging event engine 242 includes instructions to communicate with application 222 to incorporate the user of client device 110 into a rich communication messaging event as disclosed herein. Rich communication messaging event engine 242 may also include instructions to store information and other data related to a rich communication messaging event as disclosed herein into database 252. Furthermore, in some embodiments rich communication messaging event engine 242 may include instructions to retrieve at least some of the data in database 252 and provide to one or more participants in a rich communication messaging event as disclosed herein.

In some embodiments, rich communication messaging event engine 242 stores data in and maintains for a selected period of time, database 252. Further, rich communication messaging event engine 242 updates different changes and modifications on a document or file discussed during the rich communication messaging event, as part of a chat/topic history, as stored in database 252. In some embodiments, the activity, notes, and other actions taken by different participants over a document or any other topic item are displayed around the item, showing the specific participant that has participated in the activity. As mentioned above the document stored by server 130 in database 242 may include an application-based document (e.g., a text-rich document such as a Word, document, a PDF document, or any other document accessible through a text editing application, including a computer code sequence, and the like), a spreadsheet document (e.g., Excel and the like), a presentation document (e.g., Power Point and the like), an XML file, an HTML file or a multi-media file such as a video, audio, image file, or any combination of the above.

The user may access rich communication messaging event engine 242 through application 222 installed in memory 220 of client device 110. The user may also access rich communication messaging event engine 242 via a web browser installed in client device 110. Execution of application 222 may be controlled by a processor 212 in client device 110. In some embodiments, application 222 is downloaded and installed by the user into client device 110, from server 130.

Processor 236 is configured to execute instructions, such as instructions physically coded into processor 236, instructions received from software in memory 232, or a combination of both. A user of client device 110 may use input device 214 to submit a document or a media file to rich communication messaging event engine 242 via a user interface of application 222. The document submitted by the user may be include an application-based document (e.g., a text-rich document such as a Word, document, a PDF document, or any other document accessible through a text editing application, including a computer code sequence, and the like), a spreadsheet document (e.g., Excel and the like), a presentation document (e.g., Power Point and the like), an XML file, an HTML file or a multi-media file such as a video, audio, image file, or any combination of the above.

Figure 3:
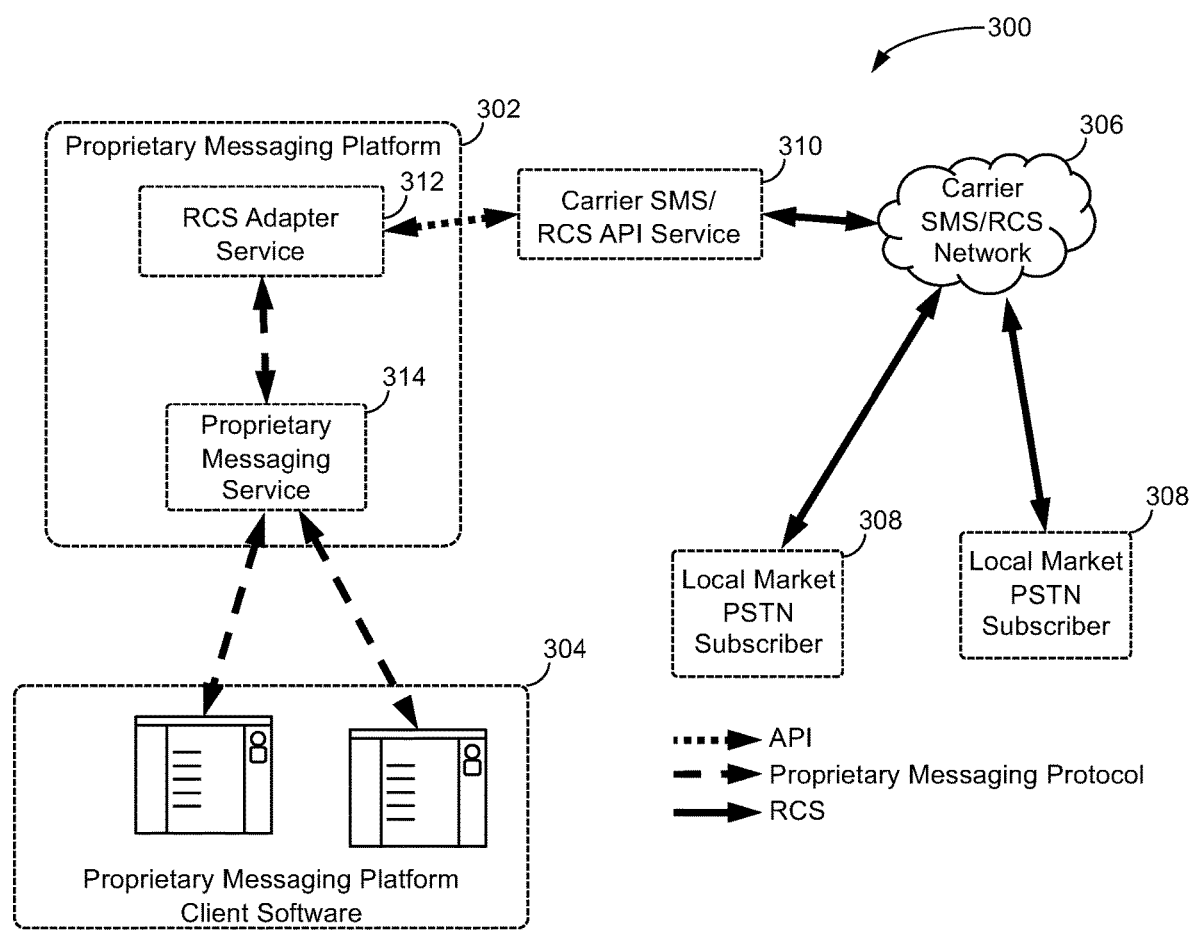
FIG. 3 is a block diagram illustrating data flow among components of a system providing interoperability for advanced messaging features between RCS and proprietary messaging platforms, according to some embodiments.

FIG. 3 is a block diagram illustrating data flow among components of a system 300 for providing interoperability for advanced messaging features between RCS and proprietary messaging platforms, according to some embodiments. In some implementations, system 300 may include one or more of a proprietary messaging service 302, proprietary messaging service client software 304, a carrier SMS/RCS network 306, one or more local market PSTN subscriber(s) 308, a carrier SMS/RCS API service 310, an RCS adapter service 312, a proprietary messaging service 314, and/or other components.

The proprietary messaging platform 302 may include a messaging and/or presence service supporting messaging between individual users of a given service. The service may be based on a standard (e.g., extensible messaging and presence protocol (XMPP)) or it may be based on proprietary technology. Generally, the service may support an "advanced" feature set described herein. In some implementations, proprietary messaging platform 302 may be decomposed into separate services. For example, one service may handle messaging and another service may handle presence. However, for the purposes of this disclosure, they are described as a single logical component of system 300. In some implementations, proprietary messaging platform 302 may be part of a larger solution such as a UCaaS or CCaaS offering.

The proprietary messaging service client software 304 may include software clients used by end users of proprietary messaging service 302. The proprietary messaging service client software 304 may be in a variety of forms including (but not limited to) web-based applications, desktop client software, mobile applications, and/or other forms.

The carrier SMS/RCS network 306 may include an SMS network deployed by a licensed operator for consumer or business mobile subscribers that has rolled out RCS support.

The local market PSTN subscriber(s) 308 may include mobile devices connected to carrier SMS/RCS network 306. The local market PSTN subscriber(s) 308 may be enabled for RCS.

The carrier SMS/RCS API service 310 may include a service providing a number of capabilities to support interoperability with outside messaging services. The carrier SMS/RCS API service 310 may facilitate an ability for an outside application (e.g., a proprietary messaging service) to register objects such as contacts and groups of contacts to be represented as stateful objects within the carrier SMS/RCS network 306. Contacts may be addressable as one or more direct inward dials (DIDs). A DID may represent a unique address within the carrier SMS/RCS network 306. A DID may include a logical phone number within the international numbering system. In some implementations, other extensions to the RCS specifications may be allowed to support non-DID address schemes.

The carrier SMS/RCS API service 310 may facilitate an ability for an outside application to create subscriptions to receive in real-time new messages. The carrier SMS/RCS API service 310 may facilitate an ability for an outside application to create subscriptions to receive in real-time state change notifications. The state change notifications may relate to RCS objects. Examples of RCS objects may include one or more of messages, contacts, groups of contacts, and/or other RCS objects within a broader RCS network.

The carrier SMS/RCS API service 310 may facilitate an ability for an outside application to publish in real-time new messages. The carrier SMS/RCS API service 310 may facilitate an ability for an outside application to publish in real-time state change notifications. The state change notifications may relate to one or more of messages, contacts, groups, and/or other state changes within the proprietary messaging service 302, which have been registered with the RCS service provider.

The format of data exchange and the protocol of the APIs may vary between implementations. The actual transmission of messages and notifications may occur via a different service within the SMS/RCS carrier platform. However, for the purposes of this disclosure, any such ancillary service may be considered to be part of the carrier SMS/RCS API service 310.

The RCS adapter service 312 may include a service deployed alongside the proprietary messaging service 314. The RCS adapter service 312 may provide an adapter layer between the carrier SMS/RCS API service 310 and the proprietary messaging service 302. The RCS adapter service 312 may be configured to register users of the proprietary messaging platform 302 as contacts with the carrier SMS/RCS network 306 via the carrier SMS/RCS API service 310. The RCS adapter service 312 may be configured to create subscriptions for messages and notifications on behalf of registered contacts.

The RCS adapter service 312 may be configured to create and/or register groups of contacts with the carrier SMS/RCS network 306 via the carrier SMS/RCS API service 310. The groups of contacts may include one or more users of the proprietary messaging service 302. The groups of contacts may include one or more SMS/RCS contacts within the carrier SMS/RCS network 306.

The RCS adapter service 312 may be configured to facilitate bidirectional sending and receiving of messages and notifications between the carrier SMS/RCS network 306 (e.g., via the SMS/RCS Carrier service) and the proprietary messaging platform 302 performing necessary data and protocol conversions as necessary. The actual transmission of messages and notifications may occur via a different service within the proprietary messaging service 302. However, for the purposes of this disclosure, any such ancillary service may be considered to be part of the RCS adapter service 312.

During SMS/RCS contact registration, a user of the proprietary messaging platform 302 may be registered as an RCS capable contact within the carrier SMS/RCS network 306. In some implementations, a provisioning and/or configuration change may occur within an administration tool and/or an automated process within the proprietary messaging service 302. The provisioning and/or configuration change may be based on an enabling of an entitlement. The entitlement may grant the user an ability to participate in messaging with external contacts in the carrier SMS/RCS network 306.

In some implementations, an association of a specific DID with the given user may be required to be used as an address within the carrier SMS/RCS network 306. In some implementations, RCS specifications may allow for domain-based and/or other addressing schemes. In some implementations, an SMS/RCS carrier may be an underlying voice carrier for the DID. The SMS/RCS carrier may be responsible for issuing the DID as part of this process. In some implementations, the SMS/RCS carrier may not be the underlying voice carrier but the SMS/RCS carrier may nevertheless be able to advertise on the carrier SMS/RCS network 306 that the SMS/RCS carrier is the carrier responsible for the handling of messages for the given DID.

A user within the proprietary messaging platform 302 may be granted an ability to participate in messaging with external contacts in the carrier SMS/RCS network 306 by some configuration, provisioning, and/or other entitlement within the proprietary messaging service 302. The provisioning/configuration may trigger the RCS Adapter Service 312 to register a contact with an assigned SMS/RCS address (e.g., a DID) with the carrier SMS/RCS network 306 via the carrier SMS/RCS API service 310. The carrier SMS/RCS API service 310 may trigger a "provisioning" flow within the carrier SMS/RCS network 306 thereby enabling RCS messaging services for the contact/address.

According to some embodiments, in order for the RCS adapter service 312 to receive notifications (e.g., typing notifications, delivery/read receipts for sent messages, etc.) as well as messages sent to the addresses of registered contacts, the RCS adapter service 312 may create a subscription on behalf of the given contact. In some implementations, an SMS/RCS contact registration process may implicitly include the creation of such a subscription.

In some implementations, notifications and messages for all registered contacts may occur via a predetermined transport and protocol (e.g., stateful TCP connections) between the carrier SMS/RCS API service 310 (or some ancillary gateway service) and the RCS adapter service 312. Some implementations may require explicitly specifying network addresses, uniform resource identifiers (URIs), and/or other protocol specifics to which messages and notifications should be routed for the registered contact (e.g., an http call back URI). The subscription creation may be an explicit, separate process from the actual registration process. The specific technology (transport, protocol, etc.) used for the transmission of notifications from the carrier SMS/RCS API service 310 to the RCS adapter service 312 may vary within different implementations.

The RCS adapter service 312 may be "aware" of activity (e.g., messages sent, presence changes, typing activity, etc.) within the proprietary messaging service 302. The method by which this awareness is achieved may vary between implementations. For example, it may be through direct, synchronous pushing of the data from the proprietary messaging platform 302 to the RCS adapter service 312 or it may be event based.

Based on activity within the proprietary messaging service 302, the RCS adapter service 312 may determine what data must be propagated to the carrier SMS/RCS network 306 via the carrier SMS/RCS API service 310 and perform any necessary protocol conversion. For example, messages sent to an individual external SMS/RCS contact or a group containing one or more SMS/RCS external contacts may be converted to the format expected by the carrier SMS/RCS API service 310 and transmitted. A similar flow may occur for events for typing notifications, read receipts, etc.

For the reverse direction, the RCS adapter service 312 may create subscriptions within carrier SMS/RCS API service 310 to receive messages and events relating to specific "objects" within the carrier SMS/RCS network 306 such messages sent to individual contact addresses for contacts within the proprietary messaging platform 302 and groups containing these contacts as well as events generated within the carrier SMS/RCS network 306 by remote/external SMS/RCS contacts activity (such as typing a reply, having read a message, etc.). Similar to the relationship between the RCS adapter service 312 and the proprietary messaging service 302, the carrier SMS/RCS API service 310 may be made "aware" of pertinent messages and events that relate to the subscriptions and will propagate this data to the RCS adapter service 312 of the UCaaS/CCaaS platform. Upon receipt, the RCS adapter service 312 may process the incoming data and perform any necessary conversion and propagation of the data to the proprietary messaging service 302.

The disclosed system(s) address a problem in traditional text and other media messaging techniques tied to computer technology, namely, the technical problem of an SMS-based participant not getting the benefit of the advanced messaging features and/or other technical problems. The disclosed system solves this technical problem by providing a solution also rooted in computer technology, namely, by providing for providing interoperability for advanced messaging features between RCS and proprietary messaging platforms. The disclosed subject technology further provides improvements to the functioning of the computer itself because it improves processing and efficiency in text and other media messaging.

Figure 4:
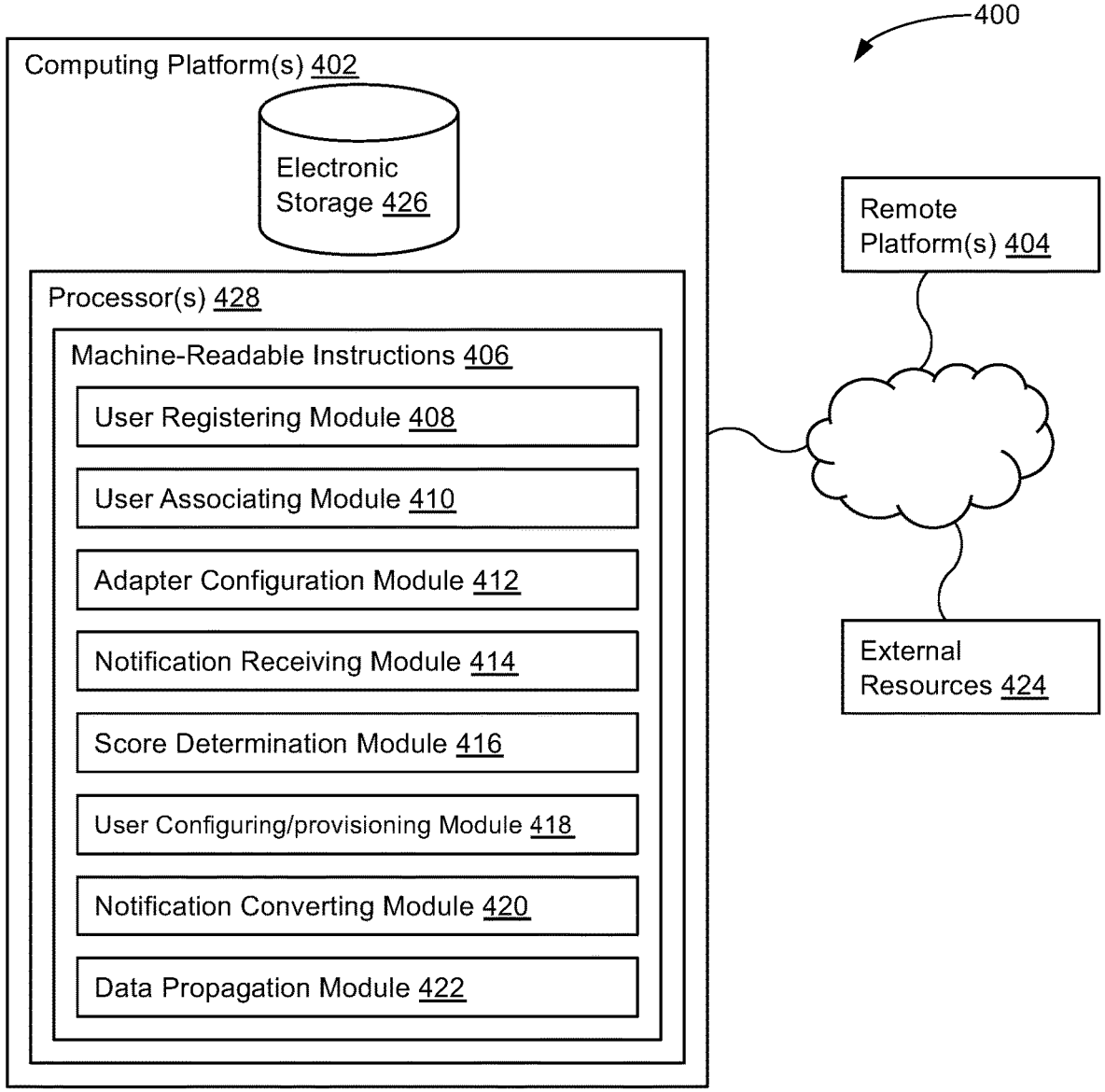
FIG. 4 illustrates an example system for providing interoperability for advanced messaging features between RCS and proprietary messaging platforms, according to some embodiments.

FIG. 4 illustrates an example system 400 for providing interoperability for advanced messaging features between RCS and proprietary messaging platforms, according to some embodiments. In some implementations, system 400 may include one or more computing platforms 402. Computing platform(s) 402 may be configured to communicate with one or more remote platforms 404 according to a client/server architecture, a peer-to-peer architecture, and/or other architectures. Remote platform(s) 404 may be configured to communicate with other remote platforms via computing platform(s) 402 and/or according to a client/server architecture, a peer-to-peer architecture, and/or other architectures. Users may access system 400 via remote platform(s) 404.

Computing platform(s) 402 may be configured by machine-readable instructions 406. Machine-readable instructions 406 may include one or more instruction modules. The instruction modules may include computer program modules. The instruction modules may include one or more of user registering module 408, user associating module 410, adapter configuration module 412, notification receiving module 414, score determination module 416, user configuring/provisioning module 418, notification converting module 420, data propagation module 422, and/or other instruction modules.

User registering module 408 may be configured to register a user of a messaging platform with an external network. The messaging platform may include a proprietary messaging service. The proprietary messaging service may include a closed service. The external network may include a short messaging service network or a rich communication services network. By way of non-limiting example, the SMS network may include a text messaging service component of a telephone, Internet, or mobile device system.

The SMS network may use standardized communication protocols to enable an exchange short text messages. By way of non-limiting example, the RCS network may include a multimedia messaging service component of a telephone, Internet, or mobile device system. The RCS network may use standardized communication protocols to enable an exchange of multimedia messages. The adapter may be configured to register users of the messaging platform as contacts with external network. The adapter may be configured to create or register groups of contacts with a carrier of the external network. The adapter may be configured to create or register groups of contacts via a carrier application programming interface.

The group of contacts may include one or more users of the proprietary messaging service. The group of contacts may include one or more users of the external network. The adapter may be configured to facilitate bidirectional sending and receiving of messages and notifications between the messaging platform and the external network such that data and protocol conversions are performed. Notifications and messages for all registered contacts may occur via a predetermined transport and protocol between an application programming interface or an ancillary gateway service of a carrier of the external network and the adapter.

User associating module 410 may be configured to associate the user with an identifier of the external network. By way of non-limiting example, the identifier may include a direct-inward-dial web domain, or web address. A carrier of the external network may be an underlying voice carrier for the DID. A carrier of the external network may be not an underlying voice carrier for the DID. The carrier of the external network may be responsible for handling messages associated with the DID.

Adapter configuration module 412 may be configured to configure an adapter to receive notifications from the identifier of the external network via a subscription. By way of non-limiting example, the notifications may include one or more of messages delivery, messages read, presence changes, or typing activity.

Notification receiving module 414 may be configured to receive, via the adapter at the messaging platform, the notifications from the identifier of the external network based on the subscription.

Score determination module 416 may be configured to determine an engagement score based on interactions of the user. The engagement score may be based on one or both of a length of time to read a reply or a delay until typing a response. The engagement score may be a basis for prioritizing a conversation among other conversations. The predetermined transport and protocol may include stateful transmission control protocol connections.

User configuring/provisioning module 418 may be configured to configuring/provision user with an entitlement of the messaging platform. Registering the user of the messaging platform with the external network may include provisioning a configuration change within an administration tool associated with the messaging platform. The configuration may change being based on enabling an entitlement granting the user an ability to participate in messaging with external contacts in the external network. The carrier of the external network may be responsible for issuing the DID to the user. The adapter may be configured to create subscriptions for messages and notifications on behalf of registered contacts of the user.

Notification converting module 420 may be configured to convert, at the messaging platform, the received notifications into a format that is compatible with the messaging platform.

Data propagation module 422 may be configured to propagate data from the messaging platform to the identifier of the external network based on activity of the user.

In some implementations, computing platform(s) 402, remote platform(s) 404, and/or external resources 424 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 402, remote platform(s) 404, and/or external resources 424 may be operatively linked via some other communication media.

A given remote platform 404 may include one or more processors configured to execute computer program modules. The computer program modules may be configured to enable an expert or user associated with the given remote platform 404 to interface with system 400 and/or external resources 424, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms.

External resources 424 may include sources of information outside of system 400, external entities participating with system 400, and/or other resources. In some implementations, some or all of the functionality attributed herein to external resources 424 may be provided by resources included in system 400.

Computing platform(s) 402 may include electronic storage 426, one or more processors 428, and/or other components. Computing platform(s) 402 may include communication lines, or ports to enable the exchange of information with a network and/or other computing platforms. Illustration of computing platform(s) 402 in FIG. 4 is not intended to be limiting. Computing platform(s) 402 may include a plurality of hardware, software, and/or firmware components operating together to provide the functionality attributed herein to computing platform(s) 402. For example, computing platform(s) 402 may be implemented by a cloud of computing platforms operating together as computing platform(s) 402.

Electronic storage 426 may comprise non-transitory storage media that electronically stores information. The electronic storage media of electronic storage 426 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by processor(s) 428, information received from computing platform(s) 402, information received from remote platform(s) 404, and/or other information that enables computing platform(s) 402 to function as described herein.

Processor(s) 428 may be configured to provide information processing capabilities in computing platform(s) 402. As such, processor(s) 428 may include one or more of a digital processor, an analog processor, a digital circuit designed to process information, an analog circuit designed to process information, a state machine, and/or other mechanisms for electronically processing information. Although processor(s) 428 is shown in FIG. 4 as a single entity, this is for illustrative purposes only. In some implementations, processor(s) 428 may include a plurality of processing units. These processing units may be physically located within the same device, or processor(s) 428 may represent processing functionality of a plurality of devices operating in coordination. Processor(s) 428 may be configured to execute modules 408, 410, 412, 414, 416, 418, 420, and/or 422, and/or other modules. Processor(s) 428 may be configured to execute modules 408, 410, 412, 414, 416, 418, 420, and/or 422, and/or other modules by software; hardware; firmware; some combination of software, hardware, and/or firmware; and/or other mechanisms for configuring processing capabilities on processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, 416, 418, 420, and/or 422 are illustrated in FIG. 4 as being implemented within a single processing unit, in implementations in which processor(s) 428 includes multiple processing units, one or more of modules 408, 410, 412, 414, 416, 418, 420, and/or 422 may be implemented remotely from the other modules. The description of the functionality provided by the different modules 408, 410, 412, 414, 416, 418, 420, and/or 422 described below is for illustrative purposes, and is not intended to be limiting, as any of modules 408, 410, 412, 414, 416, 418, 420, and/or 422 may provide more or less functionality than is described. For example, one or more of modules 408, 410, 412, 414, 416, 418, 420, and/or 422 may be eliminated, and some or all of its functionality may be provided by other ones of modules 408, 410, 412, 414, 416, 418, 420, and/or 422. As another example, processor(s) 428 may be configured to execute one or more additional modules that may perform some or all of the functionality attributed below to one of modules 408, 410, 412, 414, 416, 418, 420, and/or 422.

Figure 5:
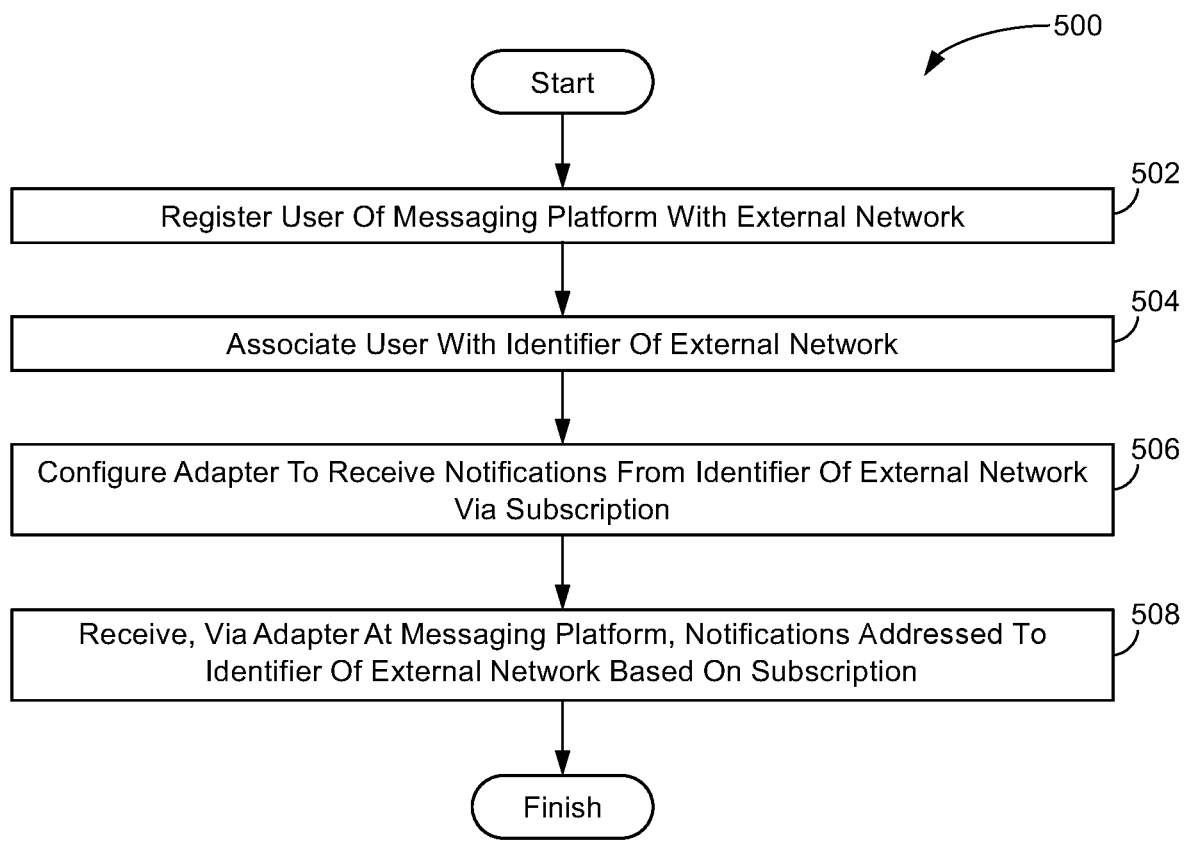
FIG. 5 is a flowchart illustrating steps of a method for providing interoperability for advanced messaging features between RCS and proprietary messaging platforms, according to some embodiments.

FIG. 5 an example flow diagram (e.g., process 500) for providing interoperability for advanced messaging features between RCS and proprietary messaging platforms, according to certain aspects of the disclosure. For explanatory purposes, the example process 500 is described herein with reference to FIG. 4. Further for explanatory purposes, the steps of the example process 500 are described herein as occurring in serial, or linearly. However, multiple instances of the example process 500 may occur in parallel. For purposes of explanation of the subject technology, the process 500 will be discussed in reference to FIG. 4.

At step 502, the process 500 may include registering a user of a messaging platform with an external network. Step 502 may be performed by one or more hardware processors configured by machine-readable instructions including a module that is the same as or similar to user registering module 408, according to certain aspects of the disclosure.

At step 504, the process 500 may include associating the user with an identifier of the external network. Step 504 may be performed by one or more hardware processors configured by machine-readable instructions including a module that is the same as or similar to user associating module 410, according to certain aspects of the disclosure.

At step 506, the process 500 may include configuring an adapter to receive notifications from the identifier of the external network via a subscription. Step 506 may be performed by one or more hardware processors configured by machine-readable instructions including a module that is the same as or similar to adapter configuration module 412, according to certain aspects of the disclosure.

At step 508, the process 500 may include receiving, via the adapter at the messaging platform, the notifications addressed to the identifier of the external network based on the subscription. For example, a user may be registered with a carrier SMS/RCS network and setup with a phone number as an identifier. When other SMS/RCS subscribers send messages to the phone number, they may be addressed to the number and may then be relayed to a proprietary messaging platform based on a created subscription. Step 508 may be performed by one or more hardware processors configured by machine-readable instructions including a module that is the same as or similar to notification receiving module 414, according to certain aspects of the disclosure.

Hardware Overview

Figure 6:
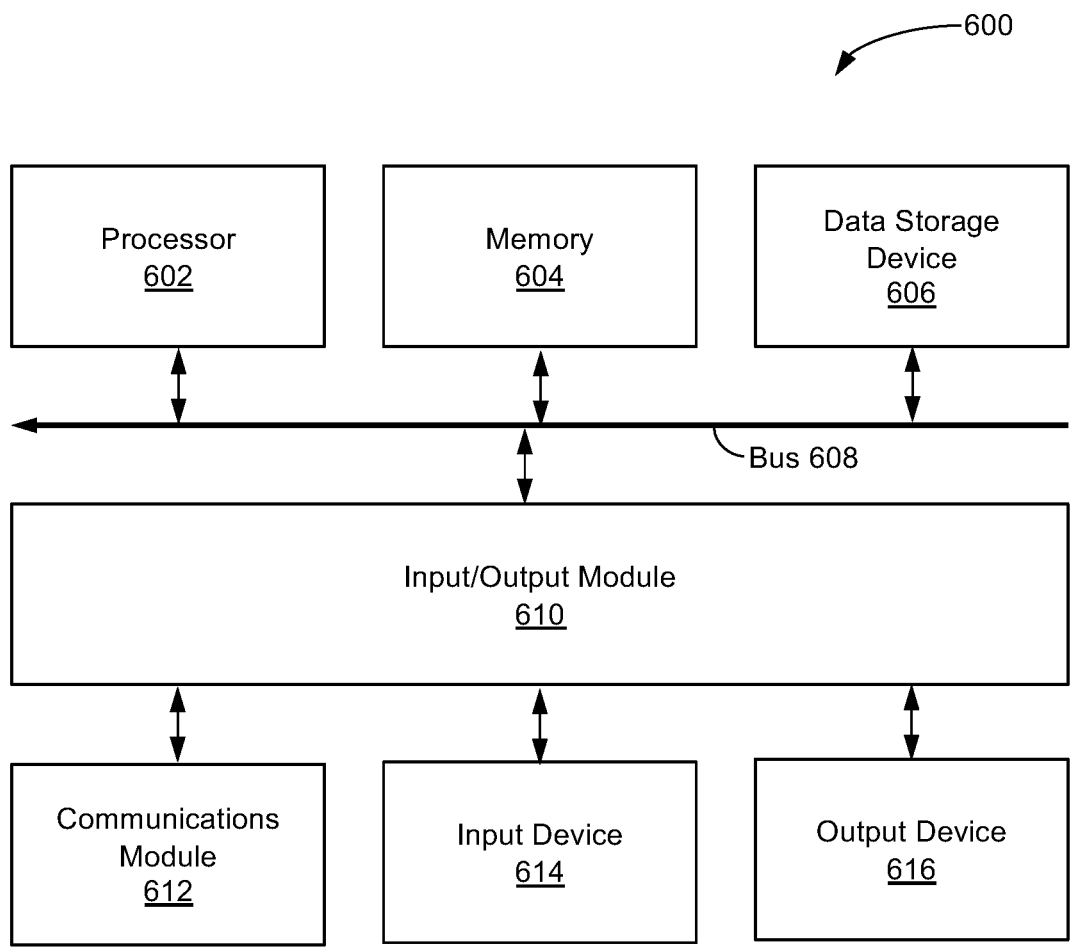
FIG. 6 is a block diagram illustrating an example computer system with which the computing platforms (e.g., client and server) of FIGS. 1, 2, and 4, and the method of FIG. 5 can be implemented, according to some embodiments.

FIG. 6 is a block diagram illustrating an example computer system with which the computing platforms (e.g., client and server) of FIGS. 1, 2, and 4, and the method of FIG. 5 can be implemented, according to some embodiments. In certain aspects, the computer system 600 may be implemented using hardware or a combination of software and hardware, either in a dedicated server, or integrated into another entity, or distributed across multiple entities.

Computer system 600 (e.g., client device 110, server 130, computing platform(s) 402, and remote platform(s) 404) includes a bus 608 or other communication mechanism for communicating information, and a processor 602 (e.g., processor(s) 212, 236, and 428) coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, a code that creates an execution environment for the computer program in question, e.g., code that constitutes processor firmware, a protocol stack, a database management system, an operating system, or a combination of one or more of them stored in an included memory 604 (e.g., memories 220 and 232 and electronic storage 426), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, a special purpose logic circuitry.

The instructions may be stored in the memory 604 and implemented in one or more computer program products, i.e., one or more modules of computer program instructions encoded on a computer readable medium for execution by, or to control the operation of, the computer system 600, and according to any method well known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. Input/output module 610 can be any input/output module. Exemplary input/output modules 610 include data ports such as USB ports. The input/output module 610 is configured to connect to a communications module 612. Exemplary communications modules 612 (e.g., communications modules 218 and 238) include networking interface cards, such as Ethernet cards and modems. In certain aspects, input/output module 610 is configured to connect to a plurality of devices, such as an input device 614 (e.g., input device 214) and/or an output device 616 (e.g., output device 216). Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 616 include display devices, such as a LCD (liquid crystal display) monitor, for displaying information to the user.

According to one aspect of the present disclosure, the client device 110 and server 130 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship with each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   registering a user of a messaging platform with an external network, the messaging platform comprising a proprietary messaging service, the external network comprising at least one of a short messaging service network or a rich communication services network;
   associating the user with an identifier of the external network, the identifier comprising at least one of a direct-inward-dial web domain or web address;
   configuring an adapter to receive notifications from the identifier of the external network via a subscription;
   receiving, via the adapter at the messaging platform, the notifications addressed to the identifier of the external network based on the subscription; and
   determining an engagement score based on interactions of the user, the engagement score based on at least one of a length of time to read a reply or a delay until typing a response.

2. The computer-implemented method of claim 1, wherein the notifications comprise one or more of messages delivery, messages read, presence changes, or typing activity.

3. The computer-implemented method of claim 1, further comprising:
   configuring/provisioning user with an entitlement of the messaging platform.

4. The computer-implemented method of claim 1, wherein notifications and messages for all registered contacts occur via a predetermined transport and protocol between an application programming interface or an ancillary gateway service of a carrier of the external network and the adapter.

5. The computer-implemented method of claim 1, further comprising:
   converting, at the messaging platform, the received notifications into a format that is compatible with the messaging platform.

6. The computer-implemented method of claim 1, further comprising:
   propagating data from the messaging platform to the identifier of the external network based on activity of the user.

7. A system configured for providing interoperability for advanced messaging features between RCS and proprietary messaging platforms, the system comprising:
   one or more hardware processors configured by machine-readable instructions to:
   register a user of a messaging platform with an external network, the messaging platform comprising a proprietary messaging service, the external network comprising at least one of a short messaging service network or a rich communication services network;
   associate the user with an identifier of the external network, the identifier comprising at least one of a direct-inward-dial web domain or web address;
   configure an adapter to receive notifications from the identifier of the external network via a subscription;
   receive, via the adapter at the messaging platform, the notifications addressed to the identifier of the external network based on the subscription; and
   determine an engagement score based on interactions of the user, the engagement score based on at least one of a length of time to read a reply or a delay until typing a response.

8. The system of claim 7, wherein the notifications comprise one or more of messages delivery, messages read, presence changes, or typing activity.

9. The system of claim 7, wherein the one or more hardware processors are further configured by machine-readable instructions to:
   configure/provision user with an entitlement of the messaging platform.

10. The system of claim 7, wherein notifications and messages for all registered contacts occur via a predetermined transport and protocol between an application programming interface or an ancillary gateway service of a carrier of the external network and the adapter.

11. The system of claim 7, wherein the one or more hardware processors are further configured by machine-readable instructions to:
   convert, at the messaging platform, the received notifications into a format that is compatible with the messaging platform; and
   propagate data from the messaging platform to the identifier of the external network based on activity of the user.

12. A non-transient computer-readable storage medium having instructions embodied thereon, the instructions being executable by one or more processors to perform a method for providing interoperability for advanced messaging features between RCS and proprietary messaging platforms, the method comprising:
   registering a user of a messaging platform with an external network, the messaging platform comprising a proprietary messaging service, the external network comprising at least one of a short messaging service network or a rich communication services network;
   associating the user with an identifier of the external network, the identifier comprising at least one of a direct-inward-dial web domain or web address;
   configuring an adapter to receive notifications from the identifier of the external network via a subscription;
   receiving, via the adapter at the messaging platform, the notifications addressed to the identifier of the external network based on the subscription; and
   determining an engagement score based on interactions of the user, the engagement score based on at least one of a length of time to read a reply or a delay until typing a response.

13. The non-transient computer-readable storage medium of claim 12, wherein the notifications comprise one or more of messages delivery, messages read, presence changes, or typing activity.

14. The non-transient computer-readable storage medium of claim 12, wherein the method further comprises:
   configuring/provisioning user with an entitlement of the messaging platform.

15. The non-transient computer-readable storage medium of claim 12, wherein notifications and messages for all registered contacts occur via a predetermined transport and protocol between an application programming interface or an ancillary gateway service of a carrier of the external network and the adapter.

16. The non-transient computer-readable storage medium of claim 12, wherein the method further comprises:
   converting, at the messaging platform, the received notifications into a format that is compatible with the messaging platform.

17. The non-transient computer-readable storage medium of claim 12, wherein the method further comprises:
   propagating data from the messaging platform to the identifier of the external network based on activity of the user.

* * * * *